United States Patent [19]

Kato et al.

[11] Patent Number: 5,714,250
[45] Date of Patent: Feb. 3, 1998

[54] DIRECT DRAWING TYPE LITHOGRAPHIC PRINTING PLATE PRECURSOR

[75] Inventors: Eiichi Kato; Hiroshi Tashiro, both of Shizuoka, Japan

[73] Assignee: Fuji Photo Film Co., Ltd., Kanagawa, Japan

[21] Appl. No.: 581,022

[22] Filed: Dec. 28, 1995

[30] Foreign Application Priority Data

Dec. 28, 1994 [JP] Japan ................... 6-328120

[51] Int. Cl.$^6$ ............... B32B 5/16; B41N 1/00; G03C 1/06
[52] U.S. Cl. ............ 428/328; 101/458; 428/341; 428/403; 430/265; 430/302; 430/304
[58] Field of Search ............. 428/328, 341, 428/403; 101/453, 458; 430/265, 302, 304

[56] References Cited

U.S. PATENT DOCUMENTS

| | | | |
|---|---|---|---|
| 4,925,761 | 5/1990 | Kulisz et al. | 430/97 |
| 5,006,169 | 4/1991 | Yoshida | 106/2 |
| 5,017,448 | 5/1991 | Kato et al. | 430/49 |
| 5,229,236 | 7/1993 | Kato et al. | 430/49 |
| 5,393,625 | 2/1995 | Kato et al. | 430/49 |
| 5,525,458 | 6/1996 | Takizawa | 430/331 |
| 5,565,290 | 10/1996 | Itakura et al. | 430/104 |

FOREIGN PATENT DOCUMENTS

| | | |
|---|---|---|
| 1-259994 | 10/1989 | Japan . |
| 1-259995 | 10/1989 | Japan . |
| 7-7554 | 1/1992 | Japan . |

*Primary Examiner*—H. Thile
*Attorney, Agent, or Firm*—McAulay Fisher Nissen Goldberg & Kiel, LLP

[57] ABSTRACT

A direct drawing lithographic printing plate precursor suitable for offset printing, capable of providing prints having a clear image with no stains, which comprise a layer containing a binding resin and a zinc oxide powder having a phytic group.

6 Claims, No Drawings

DIRECT DRAWING TYPE LITHOGRAPHIC PRINTING PLATE PRECURSOR

FIELD OF THE INVENTION

This invention relates to a direct drawing type lithographic printing plate precursor, and particularly to a direct drawing type lithographic printing plate precursor suitable for use in printing of a relatively small number of sheets (small-size printing).

BACKGROUND OF THE INVENTION

At present, direct drawing type lithographic printing plate precursors having an image receiving layer provided on a support have been widely used in office, and plate-making has been conducted by drawing an image with an oily ink on the image receiving layer by various manners, e.g., by a hand or a typewriter, or by way of ink-jet printing or thermal transfer printing. Besides, an electrophotographic copying machine for normal paper (PPC) has recently been used to form a toner image on an electrophotographic light-sensitive material by charging, exposing and developing, and then to transfer electrostatically and fix the toner image on the image receiving layer. Then, the image-bearing printing precursor is surface-treated with a desensitizing solution (a so-called "etching solution") to render the non-image areas hydrophilic, whereby a lithographic printing plate is produced.

Conventional direct drawing type lithographic printing plate precursors have, in sequence, an interlayer and a surface layer on one side of a support such as paper and a back coating layer on the other side, wherein the interlayer and the back coating layer are composed of a water-soluble resin such as polyvinyl alcohol (PVA) and starch, a water-dispersible resin such as a synthetic resin emulsion, and a pigment, and the surface layer is composed of a pigment, a water-soluble resin, and a water-resistant compound.

A typical example of such a direct drawing type lithographic printing plate precursor is one which has an image receiving layer comprising a water-soluble binder such as PVA, an inorganic pigment such as silica and calcium carbonate, and a water-resistant compound such as a melamine-formaldehyde initial condensation product as main components, as described in U.S. Pat. No. 2,532,865.

Hitherto, improvements on hydrophilicity of the non-image areas, film strength of the image receiving layer and printing durability of the resulting printing plate have been attained by using various binder resins in the image receiving layer, such as those which have a functional group capable of forming a carboxyl group, a hydroxyl group, a thiol group, an amino group, a sulfone group, or a phosphono group upon decomposition, and a heat- or photo-curable group, and which has been previously crosslinked (as described in JP-A-1-226394, JP-A-1-269593, and JP-A-1-288488 (the term "JP-A" used herein means "unexamined Japanese patent application"); by using a resin having the above functional group and a heat- or photo-curable resin in combination (as described in JP-A-1-266546, JP-A-1-275191 and JP-A-1-309068); or by using a resin having the above-described functional group and a crosslinking agent (as described in JP-A-1-267093, JP-A-1-271292, and JP-A-1-309067).

The hydrophilicity at the non-image areas has also been improved by the addition of fine resin grains containing a hydrophilic group such as a carboxyl, sulfo or phosphono group and having a gain size of not more than 1 μm in the image receiving layer (as described in JP-A-4-201387 and JP-A-4-223196), or by the addition of resin grains having a very fine grain size and containing an aforesaid functional group capable of forming an hydrophilic group upon decomposition (as described in JP-A-4-319491, JP-A-4-353495, JP-A-5-119545, JP-A-5-58071, and JP-A-5-69684).

For the inorganic pigment used in the image receiving layer of direct drawing type lithographic printing plate precursors, use of a zinc oxide powder produced by a wet method alone or together with a zinc oxide powder produced by a dry method (as described in JP-A-5-246166 and JP-A-5-254267), or use of a zinc oxide powder containing a small amount of ferrocyanate group has been reported to enable sufficient transfer of an electrophotographically formed toner image to the printing plate precursor and to prevent occurrence of stains upon printing.

However, conventional printing plates thus produced have a problem that when a large amount of the water-resistant compound is added in the image receiving layer or a hydrophobic resin is incorporated in the image receiving layer to enhance hydrophobicity so as to improve the printing durability, stains occur upon printing while the printing durability is improved. On the other hand, when the hydrophilicity of the image receiving layer is enhanced, the water resistance of the resulting printing plate is deteriorated to impair the printing durability. In particular, when printing is conducted at high temperature of not lower than 30° C., there is a problem that the surface layer is dissolved in a dampening water as used in offset printing, resulting in decrease of the printing durability and occurrence of stains. Moreover, since direct drawing type lithographic printing plate precursors are to form an image with an oily ink, etc. on the image receiving layer, insufficient adhesion between the oily ink and the image receiving layer results in poor printing durability even if the non-image areas exhibit sufficient hydrophilicity and no stains occur. This problem has not yet been solved.

In formation of a copied image of high resolution by applying the latest electrophotographic technique using a very fine dry toner, e.g., by drawing an image through electrostatic transfer of a toner image onto the image receiving layer by way of a laser printer etc., it has been particularly desired that background stains be prevented and image reproducibility be improved at the same time so as to provide prints having a clear image with no background stains.

SUMMARY OF THE INVENTION

The present invention is to solve the aforesaid problems encountered in use of the conventional direct drawing type lithographic printing plate precursors.

An object of the present invention is to provide a direct drawing type lithographic printing plate precursor exhibiting excellent desensitizing property, providing a printing plate not only free from background stains over an entire surface but also free from dot-like stains.

Another object of the present invention is to provide a direct drawing type lithographic printing plate precursor which can produce prints having a clear image without stains even when the precursor is subjected to electrostatic transfer of a toner image formed by an electrophotographic copying machine in plate-making.

It has been found that these objects are achieved by a direct drawing type lithographic printing plate precursor comprising a water-resistant support having provided thereon an image receiving layer containing a binding resin and a zinc oxide powder having a phytic group.

DETAILED DESCRIPTION OF THE INVENTION

The term "zinc oxide powder having a phytic group" used in the present invention means zinc oxide grains chemically modified with phytic acid or a salt of phytic acid to form zinc salt of phytic acid in part of the grains.

The image receiving layer of the present invention mainly contains the zinc oxide powder having a phytic group, which makes it possible to provide a printing plate precursor having an image with no missing parts in the image areas and no stains in the non-image areas, particularly in the plate-making using a dry toner type electrophotographic copying machine or a copying machine of thermal transfer type, so that prints having a clear image with no background stains can be obtained upon offset printing with the resulting printing plate which has been subjected to the desensitizing treatment.

The zinc oxide powder having a phytic group is dispersed in the image receiving layer of the present invention, the surface of which is adjusted to have the Beck smoothness in the range of from 30 to 150 (second/10 cc), and more preferably from 40 to 120 (second/10 cc). The image receiving layer is free from a problem of staining due to scattering of toner or adhesion of ink on the non-image areas, yet ensuring sufficient adhesion of the toner and ink onto the image areas, whereby reproducibility of fine lines and fine letters and uniformity in density of the solid image portions can be improved.

In contrast, an image receiving layer using a zinc oxide powder which does not process a phytic group suffers from stains on the non-image areas even if it has the Beck smoothness within the above range.

Observation of the non-image areas of the aforesaid two printing plate precursors with an optical microscope (magnification: ×200) revealed that the number of adhered. toner portion per unit area was substantially the same but the size of the adhered toner portion was markedly different from each other. That is, the number of large toner portion having a size of not less than 15 µm observed on the printing plate precursor of the present invention is significantly decreased to not more than 50% that observed on the conventional printing plate precursor. Thus, the stains on the non-image areas are negligible in the present invention and are not regarded as a problem in practical use.

Moreover, when printing is conducted using a printing plate which is finally obtained by the desensitizing treatment of the image-bearing printing plate precursor, prints having good image qualities with respect to reproducibility of fine lines and fine letters and uniformity in density of the solid image portions can be obtained with little stains, causing no problems in practice.

One main reason why the printing plate precursor of the present invention exhibits the excellent effect is believed to be due to the surface structure of the image receiving layer. To be more specific, when examined a three-dimensional surface roughness measured by a feeler type surface roughness meter and observed the surface condition with SEM, the image receiving layer of the present invention has high protrusions densely, as compared to an image receiving layer of conventional printing plate precursor containing a zinc oxide powder which has not been modified with phytic acid or a salt of phytic acid. The image receiving layer of the present invention has an average surface center roughness (SRa) defined in ISO-468 in the range of from 1.36 to 2.0 µm, and the average wavelength (Sλa), which shows the density of the surface roughness, of up to 45 µm. Because of the surface structure as described above, adhesion of the scattered toner to the non-image areas after plate-making by electrophotography and thickening of adhered toner particles during fixation can be prevented.

Another reason is because the surface of the image receiving layer of the present invention has an improved hydrophilicity. When it is measured in terms of contact angle with water, it is 63°, which indicates the surface having markedly improved hydrophilicity, in comparison with the image receiving layer of conventional printing plate precursor, the contact angle of which is 88°. This feature of the image receiving layer enhances the wettability of the layer surface with the desensitizing solution upon rapid processing of the printing plate precursor. Coupled with markedly enhanced hydrophilicity of the zinc oxide powder of the present invention due to the surface modification with a hydrophilic phytic group, the desensitization proceeds quickly and sufficiently to render the non-image areas hydrophilic.

As described above, the image receiving layer of the present invention using the zinc oxide powder obtained by the chemical modification with phytic acid or a salt of phytic acid exhibits the synergistic effect due to the specific surface structure and the surface hydrophilicity, whereby prints having good image qualities can be obtained.

The zinc oxide powder having a phytic group of the present invention can be produced by dispersing zinc oxide grains into a dispersing medium capable of dissolving phytic acid or a fattened, and adding thereto a prescribed amount of phytic acid or a salt of phytic acid under an acidic condition, preferably at pH of less than 6.0, more preferably from 3.0 to 5.0. The temperature for the above-described treatment is not particularly limited and is generally from 20° to 40 °C. Any dispersing medium may be used for the treatment as long as it has a boiling point of not more than 200 °C., preferably not more than 150 °C., such as water, a mixed solvent of water and a water-soluble organic solvent, or a non-aqueous solvent which may be used alone or as a mixture of two or more thereof. It can be considered that zinc ion is generated on the surface of zinc oxide grain due to an interfacial reaction with proton, rapidly causing the chelate reaction with phytic acid or a salt of phytic acid, and the chelate compound which is insoluble in the dispersing medium, is rapidly precipitated and fixed on the surface of the zinc oxide grain, to thereby form a chemically modified zinc oxide powder of the present invention. Basically, the amount of the chelate compound can be regulated by the ratio of zinc oxide powder to phytic acid or a salt of phytic acid to be mixed and the amount of existing proton in the dispersion.

For example, the zinc oxide grains and phytic acid or a salt of phytic acid are dispersed in the dispersing medium under an acidic condition using a wet dispersing machine as conventionally known, and then the dispersed grains are collected by centrifuging, etc., thoroughly washed with water, and dried to obtain the desired zinc oxide powder. In the case, a conventional dispersing agent is preferably added to the dispersion to control or enhance the dispersibility of the zinc oxide grains.

Alternatively, to the dispersion of zinc oxide grains and phytic acid or a salt of phytic acid, without separation of the processed zinc oxide grains, are added and dispersed a binder resin for the image receiving layer and other additives to prepare a coating composition for the image receiving layer; or a predetermined amount of phytic acid or a salt of phytic acid may be added to a dispersion as previously prepared by mixing zinc oxide grains, a binder resin and other additives to prepare a coating composition for the image receiving layer. However, the present invention is not restricted to the aforesaid preparation of the coating composition for the image receiving layer.

The zinc oxide grains used for producing the zinc oxide powder having a phytic group may be any of zinc oxide, zinc white, wet-type zinc white, and activated zinc white as commercially available, as described in "Shinban Ganryo Binran (New Edition of Pigment Handbook)", Nippon Ganryo Gijutsu Kyokai, ed., pp. 319, Seibundo, Shinkosya (1968).

To be specific, depending on the starting materials and production manners, zinc oxide is classified into two groups, those produced by a wet method, and those produce by a dry method which are further subclassified into zinc oxide grains produced by French method (indirect method) and those produced by American method (direct method).

Examples of the zinc oxide grains are those commercially available from Seido Kagaku, Sakai Kagaku, Hakusui Kagaku, Honjo Chemical, Toho Aen, Mitsui Metal Industries, etc. Preferred are zinc oxide grains obtained from the wet method since they can reduce background stains.

For chemical modification of the zinc oxide grains, there may be used phytic acid and salts of phytic acid which are soluble in the dispersing media so as to proceed the chemical modification rapidly and homogeneously during the processing of the zinc oxide grains.

Examples of salts of phytic acid include inorganic salts (e.g., lithium, sodium, and potassium salt), ammonium salt, salts with organic bases (e.g., primary amines, secondary amines, and tertiary amines, each having a hydrocarbon group (e.g., methyl, ethyl, propyl, butyl, pentyl, hexyl, heptyl, octyl, decyl, dodecyl, tridecyl, tetradecyl, hexadecyl, octadecyl, cyclohexyl, cyclooctyl, benzyl, and phenethyl) which may be substituted with a halogen atom, a hydroxy group, a cyano group, an alkoxy group or an amide group), anilines (e.g., aniline, N-methylaniline, N,N-dimethylaniline, N-ethylaniline, N-butylaniline, and N-methyl-N-butylaniline), and cyclic nitrogen compounds containing a hetero atom (e.g., pyridine, morpholine, piperazine, and pyridine). A part or all of the phospho groups of the phytic acid salts may be in the form of a salt and the formed salts may be the same or different in the phytic acid salt.

The content of phytic group on the zinc oxide grains is preferably in an amount of $1.0 \times 10^{-4}$ to $5.0 \times 10^{-2}$ mol, particularly preferably from $2.0 \times 10^{-4}$ to $4.0 \times 10^{-2}$ per 100 g of zinc oxide grains. Within this range, the resulting printing plate can provide prints having a clear copied image with particularly good image qualities and with no background stains.

In the image receiving layer of the present invention, another inorganic pigment may also be used together with the above described surface-modified zinc oxide powder. Examples of such inorganic pigments include zinc oxide, kaolin, clay, calcium carbonate, barium carbonate, calcium sulfate, barium sulfate, magnesium carbonate, titanium dioxide, silica, alumina, etc. When zinc oxide is used together with the surface-modified zinc oxide powder, the zinc oxide is preferably used in an amount of 1 to 90 parts by weight, more preferably, from 20 to 80 parts by weight, per 100 parts by weight of the surface-modified zinc oxide powder. When the other pigment among the above inorganic pigments is used together, it can be used in an amount of not more than 20 parts by weight per 100 parts by weight of the surface-modified zinc oxide powder.

The use of these other inorganic pigments within the above range allows sufficient desensitization of the non-image areas to render hydrophilic, preventing background stains on resulting prints, and ensures sufficient adhesion of the image areas onto the image receiving layer, providing prints of good image qualities with no lacking of image even when the number of prints is increased.

As the binding resin which can be utilized in the image receiving layer of the present invention, any binder resins as conventionally used can be used. Typical examples include vinyl chloride-vinyl acetate copolymers, styrene-butadiene copolymers, styrene-methacrylate copolymers, methacrylate copolymers, acrylate copolymers, vinyl acetate copolymers, polyvinylbutyral, alkyd resins, silicone resins, epoxy resins, epoxy ester resins, and polyester resins. Water-soluble macromolecular compounds such as polyvinyl alcohol, modified polyvinyl alcohol, starch, oxidized starch, carboxymethylcellulose, hydroxyethylcellulose, casein, gelatine, polyacrylates, polyvinyl pyrolidone, polyvinyl ether-maleic anhydride copolymers, polyamide, and polyacrylamide may also be used as the binder resin. These resin may be used singly or as a mixture of two or more thereof.

The molecular weight of the binding resin to be used in the image receiving layer is preferably from $1 \times 10^3$ to $1 \times 10^5$, and more preferably from $5 \times 10^3$ to $5 \times 10^5$. The glass transition temperature of the resin is preferably from $-10$ to $120°$ C., and more preferably from $0°$ to $90°$ C.

The content of the binding resin in the image receiving layer is generally from 10 to 25 parts by weight, preferably from 13 to 22 parts by weight, per 100 parts by weight of the total amount of inorgainc pigment(s). Within this range, the effect of the present invention is exhibited and, at the same time, high film strength during printing and high hydrophilicity during desensitization can be realized.

In the image receiving layer of the present invention, any other components such as a crosslinking agent, a reaction accelerator, etc. may also be contained.

A crosslinking agent may be added in order to enhance the film strength. In particular, when a water-soluble resin is used as the binding resin, a crosslinking agent is preferably added to harden the image receiving layer, thereby enhancing the water resistance.

Any conventional crosslinking agent can be used for the purpose, such as those described in "Kakyozai Handbook (Handbook for Crosslinking Agents)", Shinzo Yamamoto and Tosuke Kaneko ed., Taiseisya (1981), "Kobunshi Data Handbook, Kisohen (Macromolecule Data Handbook, Foundation)", Kobunshi Gakkai ed., Baihukan (1986), etc. Examples include ammonium chloride, metal ions, organic peroxides, organic silane compounds (e.g., silane coupling agents such as vinyltrimethoxysilane, vinyltributoxysilane, γ-glycidoxypropyltrimethoxysilane, γ-mercaptopropyltriethoxysilane, and γ-aminopropyltriethoxysilane), polyisocyanate compounds (e.g., toluidine diisocyanate, diphenylmethane diisocyanate, triphenylmethane triisocyanate, polymethylenepolyphenyl isocyanate, hexamethylene diisocyanate, isophorone diisocyanate, and high molecular weight polyisocyanates), polyol compounds.(e.g., 1,4-butane diol, polyoxypropylene glycol, polyoxyethylene glycol., and 1,1,1-trimethylolpropane), polyamine compounds (e.g., ethylenediamine, γ-hydroxypropylated ethylenediamine, , phenylenediamine, hexamethylenediamine, N-aminoethylpiperazine, and modified aliphatic polyamines), titanate coupling compounds (e.g., tetrabutoxy titanate, tetrachloroepoxy titanate, and isopropyltristearoyl titanate), aluminum coupling compounds (e.g., aluminum butylate, aluminum acetylacetate, aluminum oxide octate, and aluminum tris(acetylacetate)), polyepoxy group-containing compounds and epoxy resins (e.g., compounds as described in "Shin-epokishi Jushi (New Epoxy Resins)", Hiroshi Kakiuchi ed., Shokodo (1985), "Epokishi Jushi (Epoxy Resins)", Kuniyuki Hashimoto ed., Nikkan Kogyo Shinbunsya (1969), etc.), melamine resins (e.g., compounds described in "Yuria-Meramin Jushi (Urea-Melamine Resins) ", Ichiro Miwa and Hideo Matsunaga ed., Nikkan Kogyo Shinbunsya (1969), etc.), and poly(meth)acrylate compounds (e.g., compounds described in "Origoma (Oligomers)", Shin Ohkawara, Takeo Saegusa, Toshinobu Higashimura ed., Kodansya (1976), "Kinosei Akuriru Jushi (Functional Acrylic Resins)", Hidezo Ohmori ed., Technosystem (1985) etc.)

In order to accelerate the crosslinking reaction, a reaction accelerator may further be added. In the case where the crosslinking reaction is a chemical-bonding reaction between functional groups, examples of the reaction accelerator include organic acids (e.g., acetic acid, propionic acid, butyric acid, benzenesulfonic acid, and p-toluenesulfonic acid), phenols (e.g., phenol, chlorophenol, nitrophenol, cyanophenol, bromophenol, naphthol, and dichlorophenol), organometal compounds (e.g., acetylacetonate zirconium salt, acetylacetone zirconiumsalt, acetylaceto cobalt salt, and dibutoxytin dilaurate), dithiocarbamic acid compounds (e.g., diethyldithiocarbamate), thinouramdisulfide compounds (e.g., tetramethylthinouramdisulfide), carboxylic anhydrides (phthalic anhydride, maleic anhydride, succinic anhydride, butylsuccinic anhydride, 3,3',4,4'-tetracarboxylic acid benzophenone dianhydride, and trimellitic anhydride), etc. In the case where the crosslinking reaction is a polymerization reaction, examples of the reaction accelerator include polymerization initiators such as peroxide compounds and azobisnitrile compounds, etc.

The binder resin is preferably photochemically and/or thermally cured after coating the coating composition of the image receiving layer. The thermal curing can be effected by setting the drying conditions for the coated layer to be severer than conventional drying conditions during formation of the image receiving layer. For example, as the drying conditions, it is preferred that a higher temperature (e.g., at 60° to 150° C.) and/or a longer period of time (e.g., 5 to 120 minutes) are applied, or after drying the coated layer to eliminate a solvent, thermal processing is further carried out. With use of the aforesaid reaction accelerator, the thermal processing can be carried out under milder conditions.

The photochemical curing of the binder resin can be effected by exposing a functional group in the resin to a chemically active ray such as visible light, ultraviolet ray, far ultraviolet ray, electron beam, X-ray, γ-ray, and α-ray, with ultraviolet ray being preferred, particularly the ray having a wavelength of from 310 nm to 500 nm being more preferred. For the purpose, a low-pressure, high-pressure or superhigh-pressure mercury lamp, a halogen lamp or the like is generally used. The light-exposure is conducted usually at a distance of from 5 to 50 cm for a period of 10 seconds to 10 minutes.

The image receiving layer is provided on a water-resistant support, such as paper or plastic film which has been subjected to a treatment for improving water-resistance, or metal foil-laminated paper or plastic film.

In the present invention, for the purpose of enhancing adhesion between the support and the image receiving layer, an interlayer may be provided. To prevent curling, a back coating layer may also be provided on the back surface of the support.

The interlayer contains, as a main component, at least one resin selected from emulsion type resins such as acrylic resins, ethylene-butadiene copolymers, methacrylic ester-butadiene copolymers, acrylonitrile-butadiene copolymers, and ethylene-vinyl acetate copolymers; solvent-soluble resins such as epoxy resins, polyvinylbutyral, polyvinyl chloride, and polyvinyl acetate; and a water-soluble resins as described above. An inorganic pigment and a water-resistant compound may also be added in the interlayer, if desired.

The composition of the back coating layer is substantially the same as that of the interlayer.

When an image is electrophotographically formed on the printing plate precursor of the present invention, it is preferred that the volume intrinsic resistance of the image receiving layer of the precursor be adjusted to $10^8$ to $10^{13}$ Ωcm, for example, by adding an electrically conducting filler to the image receiving layer, the interlayer and/or the back coating layer, whereby background stains on the resulting printing plate can be further reduced.

The electrically conducting filler may be an inorganic or organic type, and it may be used independently or as a mixture of two or more. Examples of the inorganic type include salts of monovalent metal (e.g., Na, K, and Li), salts or oxides of polyvalent metals (e.g., Mg, Ca, Ba, Zn, Ti, Co, Ni, Zr, Al, and Si), and ammonium salts. The organic type may be either a low or high molecular weight compound conventionally used as an electrically conducting filler, an antistatic agents, or a surfactant. Examples of the organic type include metallic soaps (e.g., metal salts of organic carboxylic, sulfonic, or phosphonic acids), quaternary salt compounds (e.g., quaternary ammonium salts and phosphonium salts), anion surfactants, nonion surfactants, cation surfactants, and alcohol compounds (e.g., crystalline compounds such as acetylene-1,2-diolxylilene diol and bisphenol A).

The amount of the electrically conducting filler is generally from 3 to 40% by weight, preferably from 5 to 20% by weight, of the amount of the binder used in the layer to which the filler is added.

The direct drawing type lithographic printing plate precursor of the present invention is prepared by coating a coating composition for the image receiving layer on a support or on an interlayer optionally formed on the support, followed by drying the coated layer. If desired, a back coating layer may be provided on the opposite surface of the support. The coated amount (dry basis) of each of the image receiving layer, the interlayer and the back coating layer is generally from 1 to 30 g/m2 and preferably from 6 to 20 g/m2.

A printing plate is prepared by forming and fixing an image on the direct drawing type lithographic printing plate precursor of the present invention in a conventional manners and then surface-treated with a desensitizing solution to render the non-image areas hydrophilic.

For the desensitization of zinc oxide powder contained in the image receiving layer, a cyan compound-containing desensitizing solution mainly comprising a ferrocyanate or ferricyanate, a cyan-free desensitizing solution mainly comprising amine-cobalt complex, phytic acid and derivatives thereof, or guanidine derivatives, a desensitizing solution mainly comprising an inorganic or organic acid capable of forming a chelate with zinc ion, and a desensitizing solution containing a water-soluble polymer, etc. as conventionally used can be used. As the cyan compound-containing desensitizing solution, those described in JP-B-44-9045, JP-B-46-39403, JP-A-52-76101, JP-A-57107889, JP-A-54-117201, etc. can be mentioned. (The term "JP-B" used herein means "examined Japanese patent publication"). The desensitizing solutions containing a metal complex such as a cobalt complex are described in JP-A-53-104301, JP-A-53-140103, JP-A-54-18304, and JP-B-43-28404. The phytic acid compound-containing desensitizing solutions are described in JP-A-53-83807, JP-A-53-83805, JP-A-53-102102, JP-A-53-109701, JP-A-53-127003, JP-A-54-2803, JP-A-54-44901, etc. The guanidine-containing desensitizing solutions are described in JP-A-56-111695, etc. As the desensitizing solution containing an inorganic or organic acid, those described in JP-B-39-13702, JP-B-40-10308, JP-B-43-28408, JP-B-40-26124, JP-A-51-118501, etc., can be mentioned. As the water-soluble polymer-containing desensitizing solution, those described in JP-A-52-126302, JP-A-52-134501, JP-A-53-49506, JP-A-53-59502, JP-A-53-104302, JP-B-38-9665, JP-B-39-22263, JP-B-40-763, JP-B-40-2202, JP-A-49-36402, etc., can be mentioned.

During the desensitization using any of the above-described desensitizing solutions, it is assumed that zinc oxide in the surface layer (the uncovered image receiving layer, i.e., non-image areas of the image receiving layer) is ionized to form a zinc ion which reacts with a chelate-forming compound contained in the desensitizing solution to form a zinc chelate which is then deposited on the surface layer, making the non-image areas hydrophilic.

The present invention will now be described in greater detail by referring to the following Examples. It should be understood that the present invention is not limited to these Examples.

EXAMPLE 1

Surface-treatment of Zinc Oxide

A mixture of 100 g of wet-type zinc oxide (AZO, produced by Seido Kagaku K.K.), 1 g of sodium metaphosphate and 120 g of water was dispersed together with 200 g of glass beads having a diameter of from 0.7 to 1 mm for 30 minutes, at $5 \times 10^3$ rpm using a wet-dispersing machine (Dinomill, produced by Shinmaru Enterprise), and then the glass beads were filtered off. After the pH value of the dispersion was adjusted to 4.0 with a 0.1 N hydrochloric acid aqueous solution, 3 g of phytic acid was added and dispersed by a homogenizer (produced by Nippon Seiki K.K.) at $1 \times 10^3$ rpm for 1 minute, and immediately thereafter the dispersion was neutralized to pH 7.0 with a 10% sodium hydroxide aqueous solution.

The dispersion was then subjected to centrifugal separation to separate zinc oxide grains which were collected by decantation, followed by thoroughly washing with water. The thus obtained grains were dried in vacuo to obtain 95 g of white powder.

It was found from the measurement of Zn/P ratio of the surface-treated zinc oxide powder by a fluorescent X ray analysis that the content of phytic group was $4.55 \times 10^{-4}$ mol per 100 g of zinc oxide grains, showing that the reaction proceeded almost quantitatively.

Preparation of Printing Plate Precursor

A mixture of 100 g of the zinc oxide powder as described above, 0.8 g of sodium metaphosphate and 150 g of water was dispersed together with 170 g of glass beads as used above for 20 minutes at $5 \times 10^3$ rpm by Dinomill. After the glass beads were filtered off, 15 g (as solid content) of acrylic emulsion (Nipol LX 857, produced by Nippon Zeon) was added as a binder resin, and dispersed by a homogenizer for 1 minute at $1 \times 10^3$ rpm to obtain a coating composition for an image receiving layer.

The coating composition was coated on a support (ELP-1 Master, produced by Fuji Film Co., Ltd.), which is utilized for an electrophotographic lithographic printing plate precursor for a small-size printing, with a wire bar, dried at 100° C. for 1 minute to form an image receiving layer having a coated amount of 12 g/m$^2$, whereby a direct drawing type lithographic printing plate precursor was prepared.

Comparative Example 1

A direct drawing type lithographic printing plate precursor was produced in the same manner as in Example 1, except for using zinc oxide (AZO) having not surface-treated and changing the dispersing time with Dinomill in preparation of the printing plate precursor to 30 minutes.

Comparative Example 2

A direct drawing type lithographic printing plate precursor was produced in the same manner as in Example 1, except for using a mixture of 5 g of hexazinc phytic acid salt and 95 g of zinc oxide (AZO) having not surface-treated in place of 100 g of the surface-treated zinc oxide powder of the present invention and changing the dispersing time with Dinomill in preparation of the printing plate precursor to 40 minutes.

Comparative Example 3

A direct drawing type lithographic printing plate precursor was produced in the same manner as in Comparative Example 2, except for using a mixture of 10 g of hexazinc phytic acid salt and 90 g of zinc oxide (AZO) having not surface-treated and changing the dispersing time with Dinomill in preparation of the printing plate precursor to 60 minutes.

Using each of the printing plate precursors prepared in Example 1 and Comparative Examples 1 to 3, a printing plate was produced by forming an image onto the image receiving layer of the printing plate precursor by a dry toner type laser printer, and desensitizing the precursor. Then, printing was conducted using the thus produced printing plate.

The surface properties of the image receiving layer of each of the printing plate precursors before plate-making, the image formed on the precursor, the image of print produced by the resulting printing plate and the printing durability of the printing plate were examined, and the results are shown in Table 1.

TABLE 1

|  | Example 1 | Comp. Ex. 1 | Comp. Ex. 2 | Comp. Ex. 3 |
|---|---|---|---|---|
| Characteristic of image receiving layer: | | | | |
| Smoothness (sec/10 cc)*[1] | 60 | 60 | 50 | 20 |
| Three-dimensional surface roughness Ra (μm)/λa (μm)*[2] | 1.58/42.2 | 15.3/50.0 | 1.55/55.0 | 1.62/66.5 |
| Surface wettability (contact angle: °)*[3] | 63 | 88 | 85 | 70–80 |
| **Formed image by plate-making:*[4]** | | | | |
| Image quality | Good (No lacking of fine lines and letters, uniform density on solid portion) | Slightly good (No lacking of fine lines and letters, slight unevenness in density on solid portion) | Poor (Lacking of fine lines and letters, unevenness in density on solid portion) | Very poor (Remarkable lacking of image and unevenness in density) |
| Fogging on non-image area | Good (Little toner fogging) | Slightly poor (remarkable toner fogging) | Slightly poor (Much toner fogging) | Good (Little toner fogging) |
| **Printed image:*[5]** | | | | |
| Image quality | Good (No lacking of fine lines and letters, uniform density on solid portion) | Slightly good (No lacking of fine lines and letters, unevenness in density on solid portion) | Poor (Lacking of fine lines and letters, unevenness in density on solid portion) | Significantly poor |
| Fogging on non-image area | Good (Little background stains) | Poor (Remarkable back-ground stains) | Poor (Much back-ground stains) | Good |
| Printing durability:*[6] | more than 3,000 prints | Remarkable back-ground stains from the beginning of printing) | Unevenness in density at image area from the beginning of printing | Unevenness in density at image area from the beginning of printing |

Note
1) Smoothness of the image receiving layer:

The smoothness (second/10 cc) of the printing plate precursor was measured using a Beck smoothness tester (produced by Kumagaya Riko) under the condition of air volume of 10 cc.

2) Three-dimensional surface roughness:

The three-dimensional surface roughness of the printing plate precursor was measured using a three-dimensional surface roughness measuring device (SE-3FK, produced by Kosaka Kenkyusho) and a three-dimensional surface roughness analyzer (SPA-11, produced by Kosaka Kenkyusho) under the following conditions:

Measuring conditions:
Measuring length: X axis: 2.5 mm, Y axis: 0.4 mm
Axis sampling pitch: 0.05 μm
Inclined adjustment, no cutting-off Measured values:
Average surface center roughness:SRa (μm)
Average wavelength: Sλa (μm)

These measurements are according to the standard of ISO-468. In detail, a reference may be made to, for example, "Hyomen-arasa no sokutei, Hyokahou (Measurement and Evaluation of Surface Roughness)", Jiro Nara, Sogou Gijutsu Center (1983).

3) Surface wettability:

On the surface of the printing plate precursor was place 2 μl of distilled water, and the contact angle after 30 minutes was measured using a surface contact angle meter (CA-D, produced by Kyowa Kaimenkagaku K.K). The lower is the value, the better was wettability to water, indicating better hydrophilicity.

4) Formed image:

A copied image was formed on the precursor by a dry toner-type laser printer commercially available as AM-Straight Imaging System (AMSIS 120-J Plate Setter) and the image was visually evaluated with a test glass (magnification: ×20).

5) Printed image:

After a copied image was formed on the precursor in the same manner as in Note 4) above, the precursor was fed into a full automatic printer (AM-2850, produced by AM Co.) to conduct printing, wherein a desensitizing solution (SICS, produced by Nippon AM Co.) was charged in its etcher portion, a dampening solution which was prepared by diluting the desensitizing solution (SICS) four times with distilled water was charged in its dampening portion, and offset printing was conducted using a black ink. The image qualities of the 10th print was visually evaluated with a test glass 6) Printing durability Printing was carried out as in the above Note 5), and the number of prints was counted until the background stains or the image lacking was visually observed.

As shown in Table 1, the image receiving layers of the printing plate precursors of Example 1 and Comparative Example 1 exhibited substantially the same Beck smoothness, but that of Comparative Example 2 using a mixture of hexazinc salt of phytic acid and zinc oxide had decreased Beck smoothness, and that of Comparative Example 3 using a large amount of hexazinc salt of phytic acid as admixture with zinc oxide had markedly decreased Beck smoothness. This is because hexazinc salt of phytic acid has very poor dispersibility so that the surface smoothness of the image receiving layer is deteriorated. In this connection, the Beck smoothness of an image receiving layer of the printing plate precursor which was prepared in the same manner as in Example 1 except for using hexazinc salt of phytic acid alone was at most 20, and had very roughly surface.

Moreover, it was found from the results of the surface roughness of the printing plate precursors of Example 1 and Comparative Example 1 with respect to SRa (average surface center roughness which implies the magnitude of the surface unevenness) and $S\lambda a$ (average wavelength, which implies the density of the unevenness), that the precursors had substantially the same SRa values, but exhibited markedly different $S\lambda a$ values from each other. Namely, the precursor of Example 1 had unevenness formed more densely, as compared to the precursor of Comparative Example 1 while both exhibited substantially the same Beck smoothness.

In addition, the precursor of Example 1 had a lower water-contact angle, showing higher wettability (in other words, higher hydrophilicity) of the image receiving layer than those of Comparative Examples 1 to 3 containing mainly non-treated zinc oxide grains as an inorganic pigment in the image receiving layer in the case of Comparative Example 3 containing a large content of hexazinc salt of phytic acid grains, the water-contact value varied to some extent. This is considered to be because of non-uniform dispersion of zinc salt of phytic acid grains and zinc oxide grains, which influenced the surface wettability.

It is also seen that only the printing plate resulted from the printing plate precursor of the present invention which had been subjected to plate-making and desensitization attained good image qualities with respect to both the image formed on the image receiving layer and the image printed on prints. That is, the copied image formed on the precursor of the present invention by the laser printer had no missing parts in fine lines and fine letters and had uniform image density at solid image portions, showing no uneven transfer of toner, and non-image areas had little background stains, which had no problem in practical use.

In contrast, the printing plate precursor of Comparative Example 1 using the non-treated zinc oxide was insufficient for practical use because the image formed on the image receiving layer had uneven density on solid image portions and increased fog on non-image areas. The printing plate precursors of Comparative Examples 2 and 3 using a mixture of hexazinc salt of phytic acid and non-treated zinc oxide had reduced fog on non-image areas as compared to the precursor of Comparative Example 1, but they suffered from uneven transfer of toner more significantly. This tendency became more remarkable as the content of hexazinc salt of phytic acid increased.

Further, only the printing plate precursor of the present invention produced more than 3,000 prints having an image with no missing parts on fine lines and letters and with uniform density on solid image portions, whereas the precursor of Comparative Example 1 produced prints having unevenness on the image areas and remarkable background stains on the non-image areas, and those of Comparative Examples 2 and 3 produced prints having less background stains on the non-image areas than that of Comparative Example 1 but suffered from more remarkable unevenness on the image areas, not satisfactory for practical use. Thus, no prints having satisfactory image qualities were obtained from the beginning of printing when the precursors of Comparative Examples 1 to 3 were used.

From these results, it is considered that the properties of the image receiving layer which are influenced by the zinc oxide grains incorporated therein and the image forming capability of the printing plate precursor upon plate-making and printing are closely related each other. That is, it is clearly seen from the results of dispersing conditions in preparation of the coating composition for the image receiving layer that the zinc oxide grains having a surface chemically modified in part with phytic acid or a salt of phytic acid as used in the present invention have better dispersibility than the non-treated zinc oxide grains and the chelate compound (hexazinc salt of phytic acid grains), so that the former can be dispersed comparatively uniformly in comparison with the latter, forming an image receiving layer having a smooth surface. In contrast, the dispersibility of zinc salt of phytic acid grains is very poor, and as in Comparative Examples 2 and 3, wherein non-treated zinc oxide grains were mixed therewith and dispersed, the smoothness of the image receiving layer was significantly decreased. It is, therefore, considered that the remarkable tendency of uneven transfer of the toner image and adhesion of scattered toner on the non-image areas as in Comparative Example 3 is due to failure in complete transfer of the toner image resulted from the rough surface of the image receiving layer.

It is also seen from the results of the three-dimensional roughness that the printing plate precursor of Example 1 has unevenness more densely as compared to that of Comparative Example 1 while they have almost the same Beck smoothness. Furthermore, when the portions of background stains on the non-image areas after plate-making were observed with an optical microscope (magnification: ×200), the number of the toner portion constituting the background stains was 15 per unit area (1 mm$^2$) and was the same between those of Example 1 and Comparative Example 1, but the number of the toner portion having a size of 15 μm or more was 0 or 1 in Example 1, whereas it was 4 or 5 in Comparative Example 1.

From these facts, it is considered that plate-making using the printing plate precursor of the present invention is kept from adhesion of scattered toner on the non-image areas and from thickening of toner particles upon fixing with a heat roller, resulting in little background stains. It is also considered that the difference in degree of background stains corresponds to the size of scattered toner portions on the image receiving layer which is large enough to remain even after desensitization and cause stains, while scattered toner portions of less than 15 μm in size are rendered hydrophilic upon desensitization and cause no stains. Since the surface of the hydrophobic zinc oxide is modified to have enhanced hydrophilicity in the present invention, the hydrophilicity of the image receiving layer is enhanced due to the presence of the modified zinc oxide therein so that the wettability to the desensitizing solution is markedly enhanced and the small portions of scattered toner can be rendered hydrophilic sufficiently even under rapid desensitization.

For the reasons described above, only the printing plate precursor of the present invention can provide good prints.

EXAMPLE 2

A mixture of 100 g of wet-type zinc oxide (AZO), 1 g of a dispersing agent (Caribon L-400, produced by Sanyo Chemicals), and 150 g of an aqueous solution containing 6 g of phytic acid dissolved therein whose pH had been adjusted to 4.0 with an aqueous ammonia was dispersed with 150 g of glass beads having a diameter of 0.7 to 1 mm by Dinomill at $3\times10^3$ rpm for 30 minutes, and then the glass beads were filtered off.

To the dispersion was added 15 g (as solid content) of an acrylate emulsion (AE932, produced by Nippon Gosei Rubber) as a binder resin, and the mixture was dispersed with a homogenizer at $1\times10^3$ for 1 minute to produce a coating composition for an image receiving layer.

Using a water-resistant paper produced for A.M-Straight Imaging Master SIM (produced by Nippon AM) as a support, the composition described above was coated thereon with a wire bar, dried at 80° C. for 1 minute to provide an image receiving layer having a coated amount of 10 g/m² and the Beck smoothness of 60 (seconds/10 cc).

The printing plate precursor thus prepared was subjected to plate-making and desensitization as in Example 1 to obtain a printing plate. When an offset printing was conducted using the printing plate, more than 3,000 prints having a clear image with no stains on the non-image areas as in Example 1 were obtained.

Even when plate-making was conducted by way of a thermal transfer printer (Write Movell, produced by Kanto Electronics) instead of the laser printer, the resulting image formed on the precursor had little ink transfer from an ink ribbon to the non-image areas, causing no problem in practical use. After the desensitization of the precursor with SICS as described above, the resulting printing plate provided, upon offset printing, more than 1,000 prints having good image quality with no missing on fine lines and letters and only a little stains on the non-image areas, which were still acceptable in practical use.

EXAMPLE 3

A mixture of 100 g of wet-type zinc oxide (AZO), 1.5 g of a dispersing agent (Dimor EP, produced by Kao Co., Ltd.), and 150 g of an aqueous solution containing 9 g of phytic acid dissolved therein whose pH had been adjusted to 4.0 with an aqueous ammonia was dispersed with 150 g of glass beads having a diameter of 0.7 to 1 mm using Dinomill at $5\times10^3$ rpm for 20 minutes, and then the glass beads were filtered off.

The dispersion was subjected to centrifugal separation, and the precipitate was collected, thoroughly washed with water, and dried in vacuo to obtain 90 g of solid powder.

A mixture of 60 g of the zinc oxide powder prepared above, 40 g of zinc oxide (AZO), 1.2 g of Dimor EP, and 150 g of water was dispersed together with 150 g of glass beads having a diameter of 0.7 to 1 mm by Dinomill at $3\times10^3$ rpm for 30 minutes. Thereafter, the glass beads were filtered off, and further 15 g (as solid content) of an acrylic emulsion (Sebian-A46488, produced by Dicel Chemical Industries) was added, and the mixture was stirred by a stirred at $1\times10^3$ rpm for 1 minute to produce a coating composition for an image receiving layer.

The coating composition was coated on a support for SIM as in Example 2 using a wire bar, dried at 100° C. for 1 minute to form an image receiving layer having a coated amount of 12 g/m² and the Beck smoothness of 80 (seconds/10 cc).

The printing plate precursor was subjected to plate-making and desensitization as in Example 1 to thereby obtain a printing plate. When an offset printing was conducted using the printing plate, more than 3,000 prints having a clear image with no stains on the non-image areas as in Example 1 were obtained.

EXAMPLE 4

A mixture of 100 g of the surface-modified zinc oxide powder prepared in Example 1, 15 g of binder resin B-1 having the following structure and 200 g of toluene was dispersed together with 180 g of glass beads having a diameter of 0.7 to 1 mm by Dinomill at $5\times10^3$ rpm for 2 hours, and then the glass beads were filtered off to obtain a coating composition for an image receiving layer.

Binder Resin B-1:

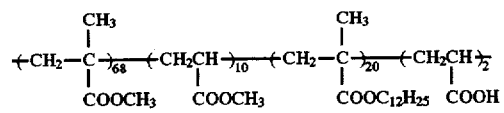

Mw $5\times10^4$ (weight ratio)

The coating composition was coated on the above-mentioned support for SIM using a wire bar, dried at 110° C. for 30 seconds to form an image receiving layer having a coated amount of 12 g/m² and the Beck smoothness of 50 (seconds/10 cc).

The printing plate precursor was subjected to plate-making and desensitization as in Example 1 to thereby obtain a printing plate. When an offset printing was conducted using the printing plate, more than 3,000 prints having a clear image with no stains on the non-image areas as in Example 1 were obtained.

EXAMPLE 5

A mixture of 100 g of wet-type zinc oxide (AZO), 0.5 g of sodium methaphosphate and 200 g of an aqueous solution having 12 g of di(2-ethylhexylamine) salt of phytic acid dissolved therein whose pH had been adjusted to 4.5 with an aqueous ammonia was dispersed in the same manner as in Example 3. Thereafter, precipitates of the dispersion were collected and dried in vacuo to obtain 92 g of white powder. A mixture of 70 g of the surface-treated zinc oxide powder as described above, 30 g of dry-type zinc oxide (SAZEX-2000, produced by Sakai Chemicals), 1 g (as solid content) of a dispersing agent (Marzel, produced by Daiichi Kogyo Seiyaku) and 110 g of water was dispersed in the same manner as in Example 3. Thereafter, the dispersion was subjected to filtration, and the thus collected precipitates were again dispersed with 15 g (as solid content) of a vinylacetate resin emulsion (Sebian-A117, produced by Dicel Chemical Industries) in 50 g of water with stirring at $1\times10^3$ rpm for 1 minute, whereby a coating composition for an image receiving layer was prepared.

The coating composition was coated on a support for SIM using a wire bar, dried at 100° C. for 1 minute to form an image receiving layer having a coated amount of 12 g/m² and the Beck smoothness of 80 (seconds/10 cc).

The printing plate precursor was subjected to plate-making and desensitization as in Example 1 to thereby obtain a printing plate. When offset printing was conducted using the printing plate, more than 3,000 prints having a clear image with no stains on the non-image areas as in Example 1 were obtained.

EXAMPLE 6

A mixture of 60 g of wet-type zinc oxide (AZO), 40 g of dry-type zinc oxide (SAZEX-2000), 1 g of sodium polystylenesulfonate and 130 g of an aqueous solution having 7 g of phytic acid dissolved therein whose pH had been adjusted to 4.0 with an aqueous ammonia was dispersed in the same manner as in Example 3. Thereafter, precipitates of the dispersion were collected and again dispersed with 14 g (as solid content) of an acrylic emulsion (AE 932) in 50 g of water with stirring at $1\times10^3$ rpm for 1 minute, whereby a coating composition for an image receiving layer was prepared.

The coating composition was coated on a support for SIM using a wire bar, dried at 100° C. for 10 minutes to form an image receiving layer having a coated amount of 13 g/m² and the Beck smoothness of 70 (seconds/10 cc).

The printing plate precursor was subjected to plate-making and desensitization as in Example 1 to thereby obtain a printing plate. When offset printing was conducted using the printing plate, more than 3,000 prints having a clear image with no stains on the non-image areas were obtained.

Even when the plate-making was conducted using a thermal transfer printer, followed by desensitization of the printing plate precursor, the resulting printing plate provided more than 1,000 prints having a clear image with no stains on the non-image areas.

As is clearly seen from the above description, the direct drawing lithographic printing plate precursor of the present invention has an excellent desensitizing property as an offset printing plate precursor, free from background stains and dot-like stains. Even when plate-making of the precursor is conducted by an electrophotographic copying machine through electrostatical transfer of toner image, the resulting printing plate can produce prints having a clear copied image with no stains.

While the invention has been described in detail and with reference to specific embodiments thereof, it will be apparent to one skilled in the art that various changes and modifications can be made therein without departing from the spirit and scope thereof.

What is claimed is:

1. A direct drawing type lithographic printing plate precursor comprising a water-resistant support having thereon an image receiving layer containing a binding resin and a zinc oxide powder having a phytic group.

2. The lithographic printing plate precursor as in claim 1, wherein the zinc oxide powder contains from $1.0\times10^{-4}$ to $5.0\times10^{-2}$ mol of phytic group per 100 g of zinc oxide.

3. The lithographic printing plate precursor as in claim 1, wherein the image receiving layer has Beck smoothness of from 30 to 150 seconds/10 cc.

4. The lithographic printing plate precursor as in claim 1, wherein the image receiving layer is provided in a coated amount of 1 to 30 g/m².

5. The lithographic printing plate precursor as in claim 1, wherein the image receiving layer further contains zinc oxide grains other than said zinc oxide powder in an amount of 1 to 90 parts by weight, per 100 parts by weight of said zinc oxide powder.

6. The lithographic printing plate precursor as in claim 1, wherein the image receiving layer has a volume intrinsic resistance of $10^8$ to $10^{13}$ Ωcm.

* * * * *